(12) United States Patent
Kuwahara

(10) Patent No.: US 6,866,130 B2
(45) Date of Patent: Mar. 15, 2005

(54) TORQUE CONVERTER

(75) Inventor: Kuniaki Kuwahara, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/395,281

(22) Filed: Mar. 25, 2003

(65) Prior Publication Data

US 2003/0217902 A1 Nov. 27, 2003

(30) Foreign Application Priority Data

Mar. 25, 2002 (JP) ........................................ 2002-084279

(51) Int. Cl.$^7$ .............................................. F16H 45/02
(52) U.S. Cl. .................... 192/3.29; 192/55.61; 192/212
(58) Field of Search .............................. 192/3.29, 3.28, 192/3.3, 3.33, 212, 55.61, 3.35

(56) References Cited

U.S. PATENT DOCUMENTS

| | | | | |
|---|---|---|---|---|
| 5,713,442 A | * | 2/1998 | Murata et al. ............. | 192/3.29 |
| 5,782,327 A | * | 7/1998 | Otto et al. ................. | 192/3.29 |
| 5,829,561 A | * | 11/1998 | Arhab ........................ | 192/3.28 |
| 6,012,558 A | * | 1/2000 | Kundermann .............. | 192/3.29 |
| 6,016,894 A | * | 1/2000 | Kundermann ............... | 192/3.3 |
| 6,056,092 A | * | 5/2000 | Hinkel ....................... | 192/3.29 |
| 6,056,093 A | * | 5/2000 | Hinkel ....................... | 192/3.29 |
| 6,202,810 B1 | * | 3/2001 | Yamaguchi et al. ....... | 192/3.29 |
| 6,273,226 B1 | | 8/2001 | Hönemann et al. | |
| 6,378,676 B1 | * | 4/2002 | Chasseguet et al. ....... | 192/3.29 |
| 2003/0089567 A1 | * | 5/2003 | Bauer et al. ............... | 192/3.29 |

* cited by examiner

Primary Examiner—Rodney H. Bonck
(74) Attorney, Agent, or Firm—Burns, Doane, Swecker & Mathis, L.L.P.

(57) ABSTRACT

A torque converter includes a torque input member, a first torque transmitting member hydrodynamically transmitted with a torque from the torque input member and capable of outputting the torque to a torque output member, a clutch member engageable with the torque input member, a second torque transmitting member engageable with the clutch member, and an elastic member supported into engagement by the first torque transmitting member, capable of absorbing shock in the torque, and capable of transmitting the torque to the first torque transmitting member.

10 Claims, 2 Drawing Sheets

TORQUE CONVERTER

CROSS REFERENCE TO RELATED APPLICATIONS

Figure 1:
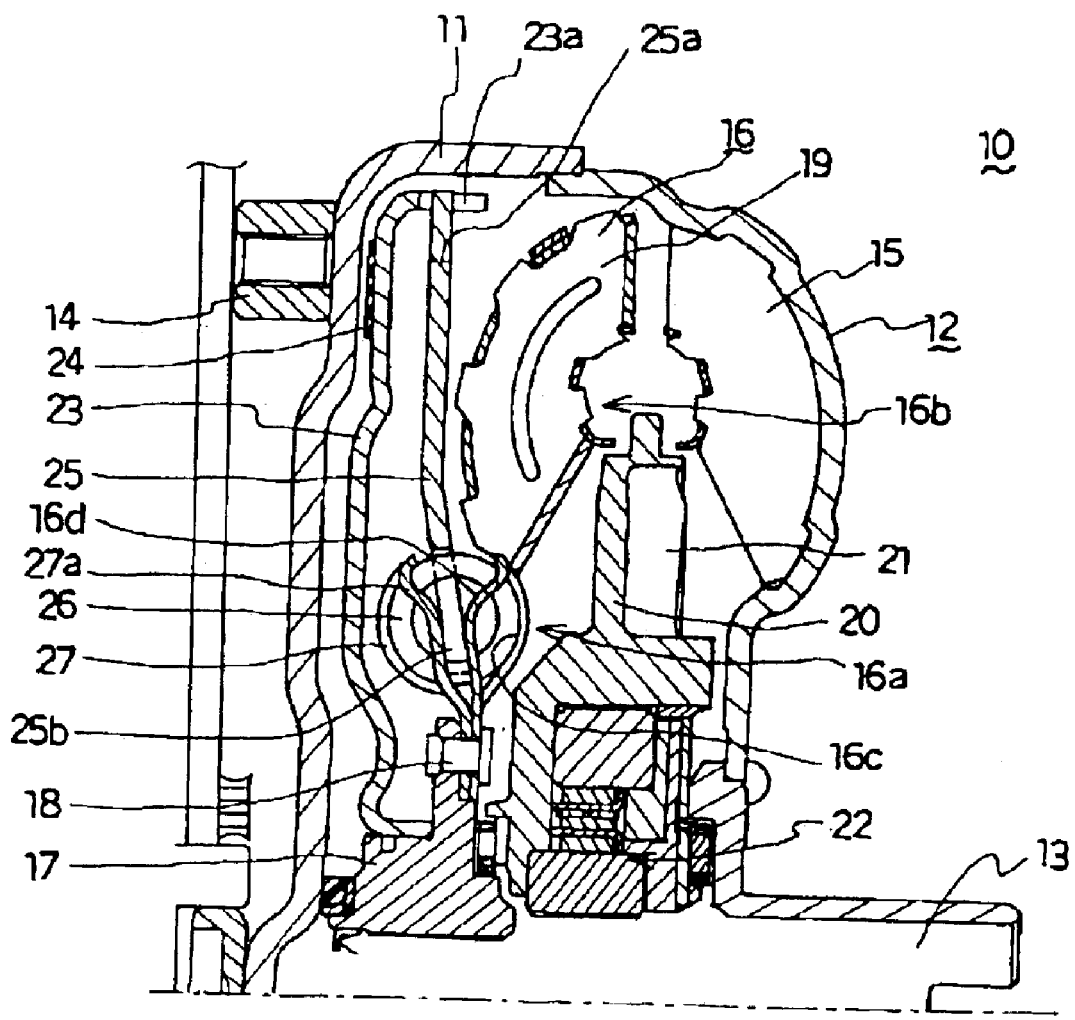

This application is based on and claims priority under 35 U.S.C. §119 with respect to a Japanese Patent Application 2002-084279, filed on Mar. 25, 2002, the entire content of which is incorporated herein by reference.

FIELD OF THE INVENTION

This invention generally relates to a torque converter in which torque transmitting is performed by a fluid coupling mechanism or by a directly transmitting method.

BACKGROUND OF THE INVENTION

A conventional torque converter is disclosed in an U.S. Pat. No. 6,273,226 which is issued on Aug. 14, 2001. The torque converter is provided with a torque input member, a first torque transmitting member, which is hydrodynamically transmitted with torque from the torque input member and can output the torque to a torque output member, a clutch member engageable with the torque input member, a pair of plates fixed to the clutch member, a second torque transmitting member fixed to the torque output member, and an elastic member, which is supported between the pair of plates for transmitting the torque to the second torque transmitting member and for absorbing vibration and fluctuation contained in the torque. That is, the torque transmitting according to the above-disclosed torque converter is performed by a fluid coupling mechanism or by a direct transmitting method with the clutch member.

However, the above-disclosed torque converter is provided with the first torque transmitting member for transmitting the torque by the fluid coupling mechanism. The torque converter is further provided with the clutch member, the pair of plates supporting the elastic member, the second torque transmitting member, and the elastic member. That is, the torque converter is provided with the aforementioned components which functions independently, thereby increasing the number of components housed therein.

The present invention therefore seeks to provide a torque converter which is capable of transmitting torque from an engine to a transmission with less number of components of the torque converter.

SUMMARY OF THE INVENTION

According to an aspect of the present invention, a torque converter includes a torque input member, a first torque transmitting member hydrodynamically transmitted with a torque from the torque input member and capable of outputting the torque to a torque output member, a clutch member engageable with the torque input member, a second torque transmitting member engageable with the clutch member, and an elastic member supported into engagement by the first torque transmitting member, capable of absorbing shock in the torque, and capable of transmitting the torque to the first torque transmitting member.

According to, another aspect of the present invention, the torque output member is a shaft and the first torque transmitting member is a shell disposed to be rotatable in a circumferential direction of the shaft integrally therewith. The first torque transmitting member includes a radially inner peripheral portion engageable with one end of the elastic member and a radially outer peripheral portion radially extending from an outer periphery of the radially inner peripheral portion and hydrodynamically transmitted with the torque from the torque input member. The second torque transmitting member is a disc arranged to be parallel with the shell in the axial direction of the shaft so as to be rotated in the circumferential direction of the shaft, and includes an inner diameter portion engageable with the other end of the elastic member and an outer diameter portion engageable with the clutch member According to a further aspect of the present invention, the radially inner peripheral portion includes a recessed portion recessed in the axial direction of the shaft, and the elastic member is disposed in the recessed portion.

BRIEF DESCRIPTION OF THE DRAWING FIGURES

Figure 2:
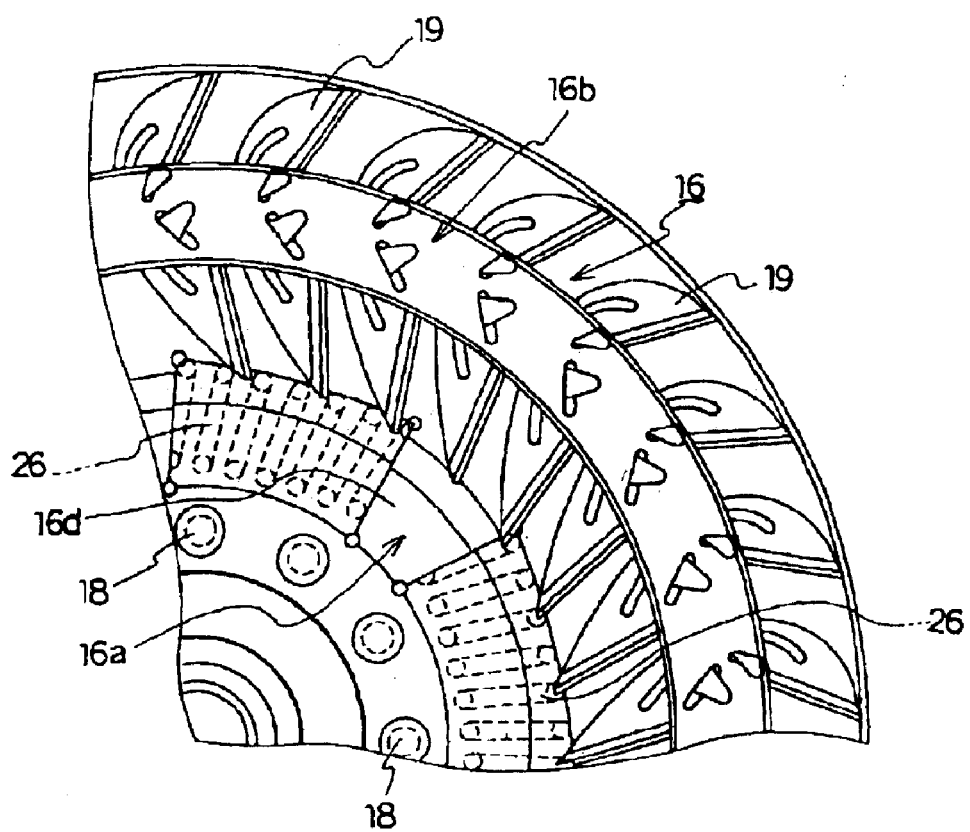

The foregoing and additional features and characteristics of the present invention will become more apparent from the following detailed description considered with reference to the accompanying drawing figures wherein:

FIG. 1 is a longitudinally cross sectional view illustrating a torque converter according to an embodiment of the present invention; and FIG. 2 is a front view illustrating a turbine shell of the torque converter according to the embodiment of the present invention.

DETAILED DESCRIPTION OF THE INVENTION

The invention will specifically described in connection with its embodiment. Here will be described one example of a power transmission line of a vehicle, to which the invention is directed. As illustrated in FIG. 1, a torque converter 10 is, in short, a device which houses a fluid coupling mechanism and a lock-up clutch mechanism so as to transmit torque from a crank shaft of an engine (not shown) through a fluid or oil to an input shaft (not shown) of an automatic transmission (not shown). The torque converter 10 is externally formed with a front cover 11 and a pump shell 12, both of which function as torque input members. A fluid working chamber is defined within the torque converter 10. The torque from the crank shaft is transmitted to the front cover 11 via a connecting portion 14 fixed to the front cover 11 and then to a shaft 13 (a torque output member) which extends from a side of the pump shell 12 and is connected to the automatic transmission. The front cover 11 is coupled to the crank shaft so as to be integrally rotated therewith. Further, the front cover 11 is fluid-tightly welded with an outer periphery of the front cover 11. Therefore, the front cover 11 is rotated integrally with the pump shell 12. A plurality of pump blades 15 are fixed to the inner surface of the pump shell 12 and are arranged in a circumferential direction thereof. The oil in the torque converter 10 circulates therein by rotating the pump shell 12, i.e. the pump blades 15.

A turbine shell 16 (a first torque transmitting member) disposed in the torque converter 10 possesses an approximately ring-shaped outline. The turbine shell 16 is fixed to a turbine hub 17 by means of a plurality of rivets 18 and is coupled to the shaft 13 via the turbine hub 17 at a central portion of the turbine shell 16. Therefore, the turbine shell 16 can be rotated integrally with the shaft 13 in a circumferential direction thereof.

The turbine shell 16 is provided with a radially inner peripheral portion 16a, which is arranged adjacent to the shaft 13, and a radially outer peripheral portion 16b, which radially extends from a radially outer periphery of the inner peripheral portion 16a. As illustrated in FIG. 1, the radially inner peripheral portion 16a is of a gradually curved shaped structure along an axis of the shaft 13 in a right-hand side direction in FIG. 1 so as to define a recessed portion 16c. The radially outer peripheral portion 16b is also of a gradually curved shaped structure along the axis of the shaft 13 in a left-hand side direction in FIG. 1 so as to define a curved portion. A plurality of turbine blades 19 are fixed to a surface of the turbine shell 16 to be disposed in the curved portion of the radially outer peripheral portion 16b and to be opposed to the pump blades 15. The torque is transmitted to the turbine blades 19 in response to the flow of the oil circulated by the pump blades 15 toward the turbine blades 19. As described above, the torque is hydrodynamically transmitted to the turbine shell 16 from the pump shell 12 via the pump blades 15 and the turbine blades 19.

The torque converter 10 further houses a stator wheel 20 disposed between the pump shell 12 and the turbine shell 16, The stator 20 is provided with a plurality of stator blades 21 which controls flow of the oil to be circulated from the turbine shell 16 to the pump shell 12. Therefore, the torque transmitted from the pump shell 12 to the turbine shell 16 can be effectively increased. The stator 20 can be rotated in a circumferential direction thereof. However, the stator 20 is restrained to be rotated only in a direction by a one-way clutch 22 disposed between the stator 20 and the shaft 13.

The torque converter 10 still further houses a lock-up clutch piston 23 (hereinafter, referred to as a LU clutch piston 23, a clutch member) which possesses an approximately ring shaped outline and is disposed between the front member 11 and the turbine shell 16. A radially inner peripheral portion of the LU clutch piston 23 is bent in the same direction as the axial direction of the shaft 13 and slidably supported by the turbine hub 17. The LU clutch piston 23 is equipped with a lock-up clutch 24 made of a friction material (hereinafter, referred to as the LU clutch 24) along a radially outer periphery at the side of the front cover 11. The LU clutch 24 can be pressed into engagement with the front cover 11 corresponding to distortion of the LU clutch piston 23 in accordance with an oil pressure control in the torque converter 10. That is, when the LU clutch piston 23 is locked against the front cover 11, i.e. when the LU clutch piston 23 is engaged with the front cover 11, the LU clutch piston 23 is transmitted with the torque directly from the front cover 11. The LU clutch piston 23 is provided with plural flange portions 23a at a radially outer edge portions thereof, which extend along the axis of the shaft 3 in the right-hand direction in FIG. 1 and are arranged in a circumferential direction of the LU clutch piston 23.

A disc 25 (a second torque transmitting member) is disposed between the LU clutch piston 23 and the turbine shell 16. The disc 25 possesses an approximately ring shaped outline and is provided with a plurality of notch portions 25a (outer diameter potions) along a radially outer edge, which allow the flange portions 23a to extend in the right-hand direction in FIG. 1. Each notch portion 25a possesses a clearance so as to freely move the flange portion 23a with a predetermined moving amount in a circumferential direction of the disc 25. When the flange portion 23a is moved with a moving amount which is substantially equal to or greater than the predetermined moving amount, the flange portion 23a can be engaged with the notch portion 25a. As described above, the disc 25 can be engaged with the LU clutch piston 23 and is further supported thereby. Further, the disc 25 can be rotated in response to the rotation of the LU clutch piston 23.

A radially inner portion of the disc 25 is opened in the radial direction and possesses a plurality of notch portions 25b (inner diameter portions) along a radially inner periphery in the circumferential direction of the disc 25. A plurality of damper springs 26 (elastic members) is disposed into the respective notch portions 25b. An end portion (the other end) of each damper spring 26 is engaged with a radially-extending surface of each notch portion 25b in response to the rotation of the disc 25 and the damper spring 26 is compressed in the circumferential direction of the disc 25. The damper springs 26 are supported into engagement by the turbine shell 16 and a damper plate 27 (a plate) which is integrally connected to the turbine shell 16 by means of the rivets 18. That is, the turbine shell 16 functions for being hydrodynamically transmitted with the torque via the oil from the pump shell 12, for supporting the damper springs 26, and for being transmitted with the torque from the damper springs 26. Therefore, the torque converter 10 according to the embodiment of the present invention can be effectively provided with the less number of components than components for the other type of torque converter, in which an independent component is required for supporting the damper springs 26.

Next, a placement of the damper spring 26 relative to the turbine shell 16 is described hereinbelow. Each damper spring 26 disposed in the disc 25 is positioned at the side of the radially inner peripheral portion 16a of the turbine shell 16. That is, the damper spring 26 is disposed adjacent to the shaft 13 between the turbine shell 16 and the damper plate 27, thereby less centrifugal force of the damper spring 26 is generated compared with the damper spring 26 positioned at the radially outer peripheral portion 16b. In this case, friction force raised between the damper spring 26 and the turbine shell 16 and between the damper spring 26 and the damper plate 27 can be effectively reduced, thereby capable of restraining damping characteristics from being deteriorated.

Further, the damper spring 26 is disposed in the recessed portion 16c. That is, the damper spring 26 is disposed overlapping a portion of the turbine shell 16 in the axial direction thereof. Therefore, the axial length of the torque converter 10 can be effectively shortened, thereby capable of economizing the inner space of the torque converter 10 and the manufacturing cost.

The recessed portion 16c possesses axially bent portions 16d and the damper plate 27 also possesses axially bent portions 27a. The bent portions 16d and 27a can be engaged with an end portion (one end) of the damper spring 26, which is an opposite end portion to the end portion engaged with the radially-extending surface of the notch portion 25b. That is, when the damper spring 26 is compressed in response to the rotation of the disc 25, the damper spring 26 absorbs variable torque and the torque is transmitted to the bent portions 16d and 27a which are pushed by the damper spring 26. In other words, the damper springs 26 are disposed between the turbine shell 16 and the turbine plate 27 for transmitting the torque and for absorbing vibrations and fluctuations in the torque. According to the embodiment of the present invention, the turbine shell 16 is separated from the damper plate 27. Alternatively, the turbine shell 16 can be formed integrally with the damper plate 27.

Description is hereinbelow given on operation of the torque converter 10. When the LU clutch 24 has not been engaged with the front cover 11, the front cover 11 and the pump shell 12 are integrally rotated in response to driving force from the engine. The torque is hydrodynamically transmitted to the turbine shell 16 via the pump blades 15, the oil, and the turbine blades 19, thereby the turbine shell 16 is rotated. Further, the shaft 13 is rotated in response to the rotation of the turbine shell 16, thereby the torque can be transmitted to the automatic transmission.

The LU clutch 24 is engaged with the front cover 11 when pressure of the oil in the torque converter 10 is controlled based upon a vehicle speed, and the like. In this case, the torque can be directly transmitted from the front cover 11 to the shaft 13. More particularly, the LU clutch piston 23 is rotated integrally with the front cover 11 via the LU clutch 24 engaged with the front cover 11. The disc 25 is rotated via the flange portions 23a engaged with the notched portions 25a. Further, the turbine shell 16 and the damper plate 27 are rotated via the damper springs 26 in response to the rotation of the disc 25, thereby the shaft 13 is rotated.

The principles, preferred embodiment and mode of operation of the present invention have been described in the foregoing specification. However, the invention which is intended to be protected is not to be construed as limited to the particular embodiments disclosed. Further, the embodiments described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A torque converter comprising:
    a torque input member;
    a first torque transmitting member hydrodynamically transmitted with a torque from the torque input member and capable of outputting the torque to a torque output member;
    a clutch member engageable with the torque input member;
    a second torque transmitting member engageable with the clutch member;
    an elastic member supported into engagement by the first torque transmitting member, capable of absorbing shock in the torque, and capable of transmitting the torque to the first torque transmitting member; and
    wherein the torque output member is a shaft, the first torque transmitting member is a shell disposed to be rotatable in a circumferential direction of the shaft integrally therewith, the first torque transmitting member includes a radially inner peripheral portion engageable with one end of the elastic member and a radially outer peripheral portion radially extending from an outer periphery of the radially inner peripheral portion and hydrodynamically transmitted with the torque from the torque input member, and the second torque transmitting member is a disc arranged to be parallel with the shell in the axial direction of the shaft so as to be rotated in the circumferential direction of the shaft, and includes an inner diameter portion engageable with the other end of the elastic member and an outer diameter portion engageable with the clutch member.

2. A torque converter according to claim 1, wherein the radially inner peripheral portion includes a recessed portion recessed in the axial direction of the shaft, and the elastic member is disposed in the recessed portion.

3. A torque converter comprising:
    a torque input member transmitted with a torque from a crank shaft in response to rotation of the crank shaft;
    a fluid chamber defined in the torque input member;
    a first torque transmitting member transmitted with the torque from the torque input member via a fluid in the fluid chamber in response to rotation of the torque input member and capable of ouputting the torque to a torque output member;
    a clutch member engageable with the torque input member;
    a second torque transmitting member engageable with the clutch member;
    an elastic member supported into engagement by the first torque transmitting member so as to absorb shock in the torque and to transmit the torque to the first torque transmitting member; and
    wherein the torque output member is a shaft transmitted with the torque from the first torque transmitting member and rotatable in a circumferential direction of the shaft integrally therewith, the first torque transmitting member is a turbine shell which includes a radially inner peripheral portion engageable with one end of the elastic member and a radially outer peripheral portion radially extending from an outer periphery of the radially inner peripheral portion, and is transmitted with the torque from the torque input member via the fluid in the fluid chamber in response to the rotation of the torque input member, and the second torque transmitting member is a disc arranged to be parallel with the turbine shell in an axial direction of the shaft and rotated in the circumferential direction of the shaft, and includes an inner diameter portion engageable with the other end of the elastic member and an outer diameter portion engageable with the clutch member.

4. A torque converter according to claim 3, wherein the radially inner peripheral portion includes a recessed portion recessed in the axial direction of the shaft, and the elastic member is disposed in the recessed portion.

5. A torque converter according to claim 4, wherein the recessed portion of the radially inner peripheral portion possesses a bent portion bent in an axially opposite direction to the recessed direction of the recessed portion, and the bent portion is engageable with the one end of the elastic member.

6. A torque converter according to claim 5, wherein the radially inner peripheral portion of the turbine shell is arranged adjacent to the shaft.

7. A torque converter according to claim 5, further comprising:
a plate connected to the turbine shell, wherein the elastic member is disposed in the disc and is supported into engagement by the turbine shell and the plate.

8. A torque converter according to claim 7, wherein the plate possesses a bent portion bent in the substantially same direction as the recessed direction of the recessed portion, the bent portion of the plate is engageable with the one end of the elastic member.

9. A torque converter according to claim 8, wherein the inner diameter portion of the disc is engaged with the other end of the elastic member in response to the rotation of the disc, and the bent portion of the turbine shell and the bent portion of the plate are engaged with the one end of the elastic member in response to the rotation of the disc.

10. A torque converter according to claim 9, wherein the clutch member possesses an approximately ring shaped structure and faces the front cover and is distorted in response to an oil pressure in the torque converter, the outer diameter portion of the disc is engageable with a flange portion of the clutch member, the disc is rotatable in response to the rotation of the clutch member, the torque from the crank shaft is straightly transmitted to the shaft via the disc engaged with the clutch member when the clutch member is engaged with the torque input member.

* * * * *